(No Model.)   D. LUBIN.   3 Sheets—Sheet 2.
CLOD CHOPPER AND PULVERIZER.

No. 350,831.   Patented Oct. 12, 1886.

Witnesses,
B. F. Krouse
H. C. Lee.

Inventor
David Lubin
By Dewey & Co.
Att'ys (No Model.) 3 Sheets—Sheet 3.
D. LUBIN.
CLOD CHOPPER AND PULVERIZER.
No. 350,831. Patented Oct. 12, 1886.
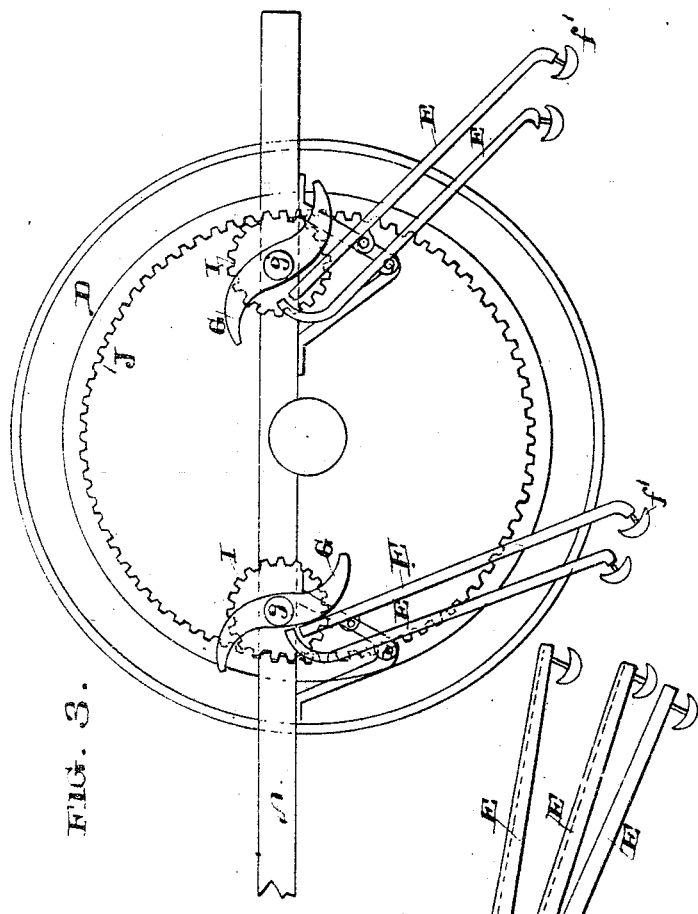
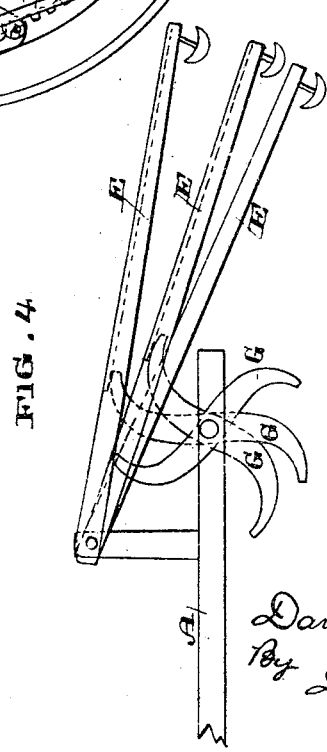
Witnesses,
Inventor,
David Lubin
By Dewey & Co.
Attys

UNITED STATES PATENT OFFICE.

DAVID LUBIN, OF SACRAMENTO, CALIFORNIA.

CLOD CHOPPER AND PULVERIZER.

SPECIFICATION forming part of Letters Patent No. 350,831, dated October 12, 1886.

Application filed July 19, 1886. Serial No. 208,493. (No model.)

*To all whom it may concern:*

Be it known that I, DAVID LUBIN, of Sacramento, Sacramento county, State of California, have invented an Improvement in Clod Choppers and Pulverizers; and I hereby declare the following to be a full, clear, and exact description of the same.

My invention relates to that class of agricultural implements used for the cultivation of the soil and known under various names—as "harrows," "cultivators," &c.; and my invention relates particularly to a machine which, from the nature of its operation and the results accomplished, may be termed a "clod chopper and pulverizer."

My invention consists, essentially, in blades or teeth of any suitable character carried by arms, frames, bars, or links, and a mechanism operated by the progression of the machine for elevating and dropping the tooth-carrying devices so that teeth will strike and chop the clods, and by this movement and by the general progression of the machine have a tendency to pulverize them, all of which, together with details of construction, I shall hereinafter fully describe.

The object of my invention is to provide a simple, practical, and effective machine for this purpose.

Figure 1:
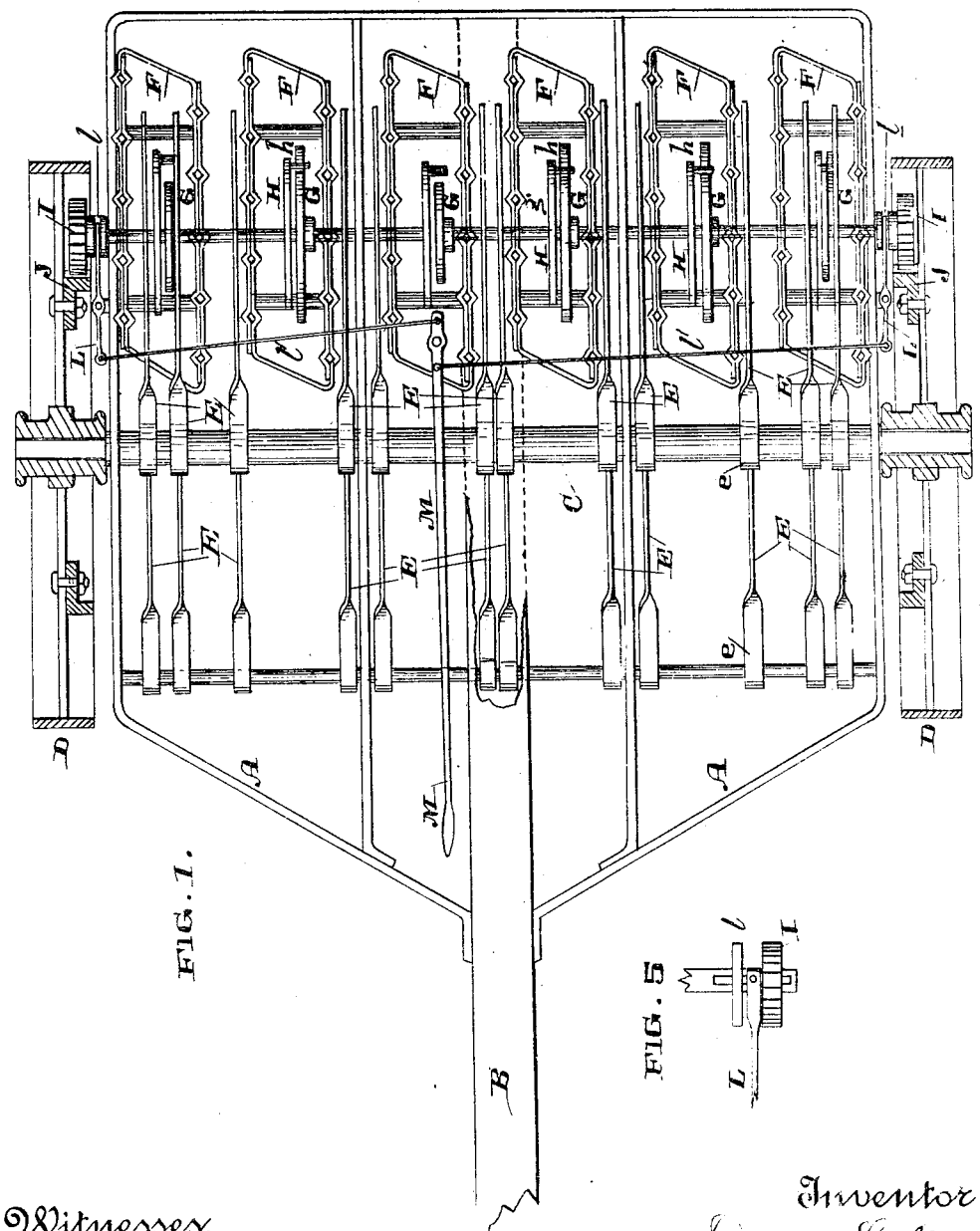
Figure 2:
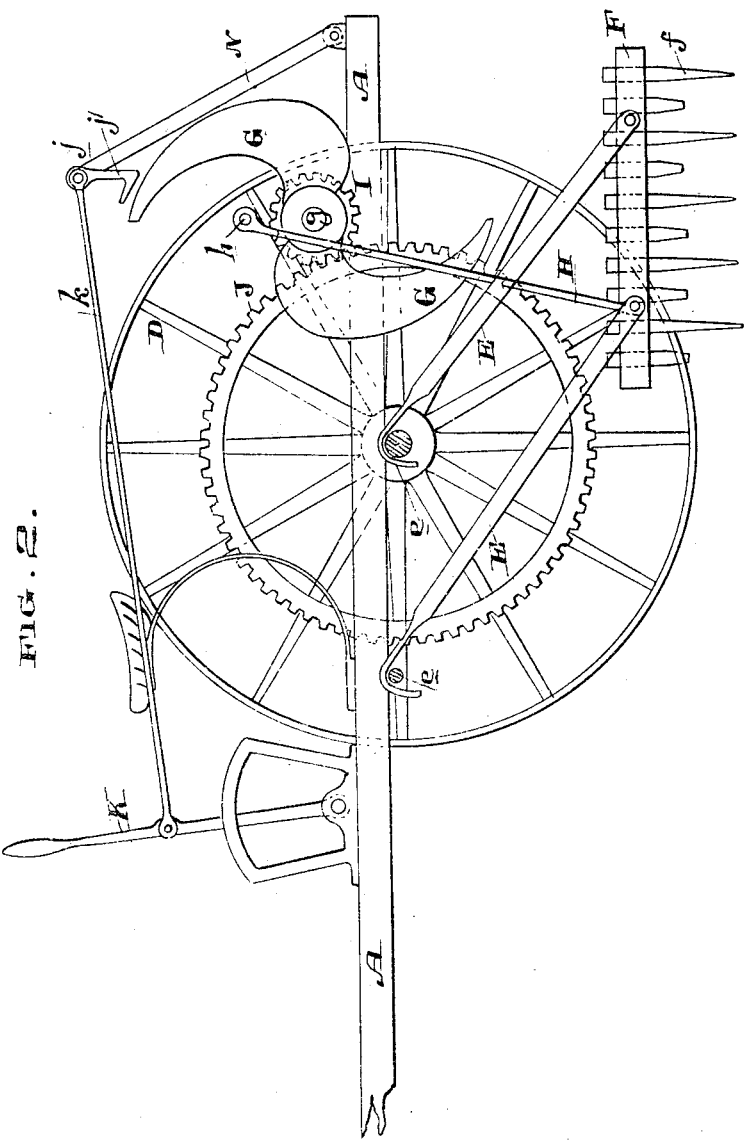

Referring to the accompanying drawings for a more complete explanation of my invention, Figure 1 is a plan of my clod chopper and pulverizer. Fig. 2 is a side elevation of same. Fig. 3 is a modification showing blades f' instead of harrow frame and teeth. Fig. 4 is a modification showing the cams traveling on the ground as wheels. Fig. 5 is a detail of the feathered pinion I.

A is the main frame of the machine, having a tongue or pole, B. The frame is mounted on a fixed axle, C, on the ends of which are loosely journaled the wheels D.

E are arms, bars, or links located in parallel planes, and in a series transversely of the main frame, their upper ends being pivoted to said frame and to the axle thereof, as shown at e. To the lower ends of these arms, bars, or links may be attached any suitable blades or teeth, or suitable frames carrying said blades or teeth. In Figs. 1, 2 I have shown small harrow-frames F, pivoted to the lower ends of the parallel arms, bars, or links E, said frames carrying the ordinary harrow-teeth, f. In Fig. 3 I have shown chopping-blades f', secured directly to the lower ends of the arms, bars, or links. It will thus be seen that teeth or blades of various forms may be attached, their use depending on the nature and condition of the soil to be cultivated.

It is the design in this machine to elevate the arms, bars, or links E and allow them to drop again. Various means may be employed for accomplishing this result, though I prefer to use the cams G, such as I have here shown. These cams are secured to a shaft, g, which is mounted on the rear of the main frame A, and each consists of two arms separated by one hundred and eighty degrees, the series of cams being arranged in a spiral manner around the shaft, or in any way in which their operation shall be alternate, successive, or simultaneous in whole or in part, as may be desired.

Attached to the frames F are links H, which extend upwardly and are provided with small studs or pins h, under which the cams G act, and by their impingement raise said links, thus raising the tooth-carrying frames F. A rotary motion is imparted to the cam-shaft g by means of pinions I upon each end of said shaft, which mesh with annular gears J, secured to the inner surface of the main driving-wheels D of the machine.

The operation of the machine, as far as described, is as follows: The rotation of the cam-shaft, which is derived from the progression of the machine, causes, through the links H, the elevation of the tooth-carrying frames F, and their subsequent drop when relieved of the cams, said frames moving perfectly parallel on account of the attachment of the parallel bars, arms, or links E. In thus dropping the toothed frames strike and chop the clods, and as they are advancing at the same time with the whole machine the tendency is to pulverize the clods so chopped. This operation of the toothed frame is a continuous one, because of the successive dropping of the frames or the simultaneous operation of several, as the case may be. Their motion is also rapid, on account of the small pinions meshing with the large gears of the main wheels. When about to make a turn, or when proceeding to or from work, it is necessary that the teeth of the machine be raised above the ground and suspended in that position. For this purpose I have the following mechanism: Pivoted at the rear of the frame are arms N, the upper ends of which carry a transverse shaft, $j$, on which are suspended gravitating hooks $j'$. This shaft is connected by a rod, $k$, with a lever, K, within convenient reach of the driver. When the lever is pushed forward, the shaft $j$ is brought to such a position that its gravitating hooks $j'$ hang directly in the path of the uprising pins $h$ of the links H, attached to the tooth-carrying frames, so that said pins, coming in contact with the beveled lower ends of the hooks, move them back while passing, and the hooks fall forward again under the pins, thus suspending the links H and the tooth-carrying frames. To relieve them again, the lever K has but to be pulled back, thereby releasing the hooks from the pins $h$, and allowing the tooth-carrying frames to drop to position. It is also necessary at times to relieve the toothed frames or bars from the action of the cam-shaft. For this purpose I mount the cam-shaft $g$ in bearings, adapting it to slide longitudinally. One of the pinions I is keyed rigidly to said shaft, while the other, as shown on the left, is on a spline or feather, Fig. 5. Each of said pinions is provided with a clutch-seat, $l$, with which a pivoted clutch-lever, L, engages. The levers are connected by rods $l'$ with a pivoted operating-lever, M, at points on each side of the pivotal center of said operating-lever. The movement of this lever M throws the feathered pinion on the one side into and out of gear with the gear J of the main wheel, and on the other side moves the cam-shaft itself longitudinally, so as to carry the pinion on that side into or out of gear with the wheel, and this longitudinal movement of the shaft causes its cams G to move to one side of the pins H, whereby the tooth-carrying frames are relieved completely.

In Fig. 3, wherein I show the attachment of blades or teeth directly to the arms or bars E, it will be seen that the elevation of said teeth is accomplished by the direct impingement of the cams G upon the upper ends of the pivoted arms, and that the rapid elevation and relief of the two arms of the one pair is effected.

Although I have shown the rotation of the cam-shaft as being effected by power derived from the wheels of the machine, I may otherwise derive its rotation from the progression of the machine, as by making the cams themselves travel on the ground, and thus act not only to rotate the shaft, but also as wheels for the machine, Fig. 4.

Having thus described my invention, what I claim as new, and desire to secure by Letters Patent, is—

1. In a clod chopper and pulverizer, the main frame and its wheels, in combination with the tooth carrying arms, bars, or links E, pivoted to said frame, the shaft $g$, geared to the wheels and having cams G, the links H, having pins $h$, operated by said cams for the elevation of the tooth-carrying bars, arms, or links E, and the means for hanging said bars, arms, or links up, consisting of the pivoted arms N, the cross-shaft $j$, carried thereby, the gravitating hooks $j'$, adapted to engage the pins $h$, the lever K, and the connecting-rod $k$, all arranged and adapted to operate substantially as herein described.

2. In a clod chopper and pulverizer, the main frame having wheels with gears J, the pivoted arms, bars, or links E, carrying teeth, and the links H, secured thereto, and having pins $h$, in combination with the longitudinally-sliding shaft $g$, having cams G impinging under said pins, the fast pinion I on one end of the shaft, and the feathered pinion I on its other end, the pivoted clutch-levers L, the pivoted operating-lever M, and connecting-rods $l'$, whereby the cam-shaft is thrown into and out of gear with the wheels and its cams out of or into engagement with the pins $h$, substantially as herein described.

In witness whereof I have hereunto set my hand.

DAVID LUBIN.

Witnesses:
 S. H. NOURSE,
 H. C. LEE.